US008700990B1

(12) United States Patent
Zhang

(10) Patent No.: US 8,700,990 B1
(45) Date of Patent: Apr. 15, 2014

(54) PDF PLUGIN TO VIEW ANY PAGE

(75) Inventor: Lei Zhang, Los Angeles, CA (US)

(73) Assignee: Google Inc., Mountain View, CA (US)

( * ) Notice: Subject to any disclaimer, the term of this patent is extended or adjusted under 35 U.S.C. 154(b) by 31 days.

(21) Appl. No.: 13/237,864

(22) Filed: Sep. 20, 2011

(51) Int. Cl.
*G06F 17/22* (2006.01)
*G06F 3/048* (2013.01)

(52) U.S. Cl.
USPC ............ 715/234; 715/237; 715/738; 715/781

(58) Field of Classification Search
USPC ......... 715/233, 234, 237, 733, 736, 738, 741, 715/744
See application file for complete search history.

(56) References Cited

U.S. PATENT DOCUMENTS

| | | | |
|---|---|---|---|
| 7,382,473 B2 * | 6/2008 | Chohsa et al. ............... | 358/1.13 |
| 8,245,049 B2 * | 8/2012 | Ramani et al. ................ | 713/182 |
| 8,250,653 B2 * | 8/2012 | Wang et al. ..................... | 726/22 |
| 2003/0028591 A1 * | 2/2003 | Goloshubin et al. .......... | 709/203 |
| 2008/0055613 A1 * | 3/2008 | Hatfield ......................... | 358/1.2 |
| 2009/0287824 A1 * | 11/2009 | Fisher et al. ................... | 709/226 |

OTHER PUBLICATIONS

Barth et al, "The Security Architecture of the Chromium Browser", publisher: Stanford University, published: 2008, pp. 1-10, http://seclab.stanford.edu/websec/chromium/.*
View Docs and PDFs Directly in Google Chrome, publisher: HowToGeek.com, published: Jun. 10, 2010, pp. 1-14, http://web.archive.org/web/20100610193809/http://www.howtogeek.com/howto/18948/view-docs-and-pdfs-directly-in-google-chrome/.*
Adobe Systems Incorporated, "PDF Reference Fifth Edition: Adobe Portable Document Format Version 1.6", publisher: Adobe Press, published: Dec. 23, 2004, pp. 1-19.*
Steinmueller et al, "Fine Art Printing for Photographers, Second Edition", Publisher: Rocky Nook, published: Apr. 18, 2008, pp. Set A: 1-8, Set B: 1-14.*
"How Chromium Displays Web Pages", The Chromium Projects, accessed Aug. 1, 2011, retrieved from <http://www.chromium.org/developers/design-documents/displayng-a-web-page-in-chrome>.
"Multi-process Architecture", The Chromium Projects, accessed Aug. 1, 2011, retrieved from <http://www.chromium.org/developers/design-documents/multi-process-architecture>.
"Inter-process Communication (IPC)", The Chromium Projects, accessed Aug. 3, 2011, retrieved from <http://www.chromium.org/developers/design-documents/inter-process-communication>.
"Process Models", The Chromium Projects, accessed Aug. 1, 2011, retrieved from <http://dev.chromium.org/developers/design-documents/process-models>.

* cited by examiner

*Primary Examiner* — Stephen Hong
*Assistant Examiner* — Wilson Tsui
(74) *Attorney, Agent, or Firm* — McDermott Will & Emery LLP

(57) ABSTRACT

Configurations for dynamically previewing web content in a portable document format (PDF) for display in a web client are provided. In a first process of the web client, a request is transmitted to a second process of the web client for generating a PDF document for web content in a first window in the web client. In the second process, the PDF document is generated for the web content in response to receiving the request from the first process and then transmitted to the first process. In the first process, a string identifier is generated for referencing the PDF document from the second process. A request is transmitted to a third process for displaying the PDF document referenced by the string identifier in a second window of the web client. In the third process, the PDF document is displayed in the second window of the web client.

23 Claims, 8 Drawing Sheets

US 8,700,990 B1

PDF PLUGIN TO VIEW ANY PAGE

BACKGROUND

In a given web client (e.g., a web browser), web content can be displayed in the web client. For example, web content can include a mixture of text and graphics (e.g., images or photos, etc.). The web client can provide for printing the web content to a specified output device (e.g., printer).

SUMMARY

The subject technology provides for dynamically previewing web content in a portable document format (PDF) for display in a web client including multiple processes. In a first process of the web client, the subject technology transmits a request to a second process of the web client for generating a PDF document for web content in a first window in the web client. In the second process of the web client, the subject technology generates the PDF document for the web content in response to receiving the request from the first process. The subject technology then transmits the generated PDF document to the first process. In the first process of the web client, the generated PDF document is received from the second process. A string identifier is generated for referencing the PDF document. A second request is transmitted to a third process for displaying the PDF document referenced by the string identifier in a second window of the web client. In the third process of the web client, the subject technology displays the PDF document in the second window of the web client in response to receiving the second request.

The subject technology further provides a system for dynamically previewing web content in a portable document format (PDF) for display in a web client including multiple processes. The system includes memory, one or more processors, and one or more modules stored in memory and configured for execution by the one or more processors. The system includes a browser user interface (UI) module configured to transmit a request for generating a PDF document for web content in a first window in the web client. The system also include a renderer module configured to render the web content to a display context in response to the request from the browser UI module. The system includes a PDF document module configured as the display context for rendering the web content by the renderer module. The system includes a PDF storage module configured to store the generated PDF document and identify the generated PDF document with a unique string identifier. Additionally, the system includes a print preview module configured to display the PDF document identified by the unique string identifier from the PDF storage module in a second window in the web client.

Yet another aspect of the subject technology provides, in a first process of a web client, transmitting a request to a second process of the web client for generating a PDF document for web content in a first window in the web client. In the second process of the web client, the subject technology generates the PDF document for the web content in response to receiving the request from the first process. The generated PDF document is then transmitted to the first process. In the first process of the web client, the subject technology generates a string identifier for referencing the PDF document received from the first process. A second request is transmitted to a third process for displaying the PDF document referenced by the string identifier in a second window of the web client. In the third process of the web client, the subject technology displays the PDF document in the second window of the web client in response to receiving the second request. The PDF document can include several pages. Next, the subject technology receives input for selecting a subset of the several pages of the PDF document. The selected subset of the several pages of the PDF document are then displayed in the second window of the web client.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several configurations of the subject technology are set forth in the following figures.

DETAILED DESCRIPTION

Figure 1:
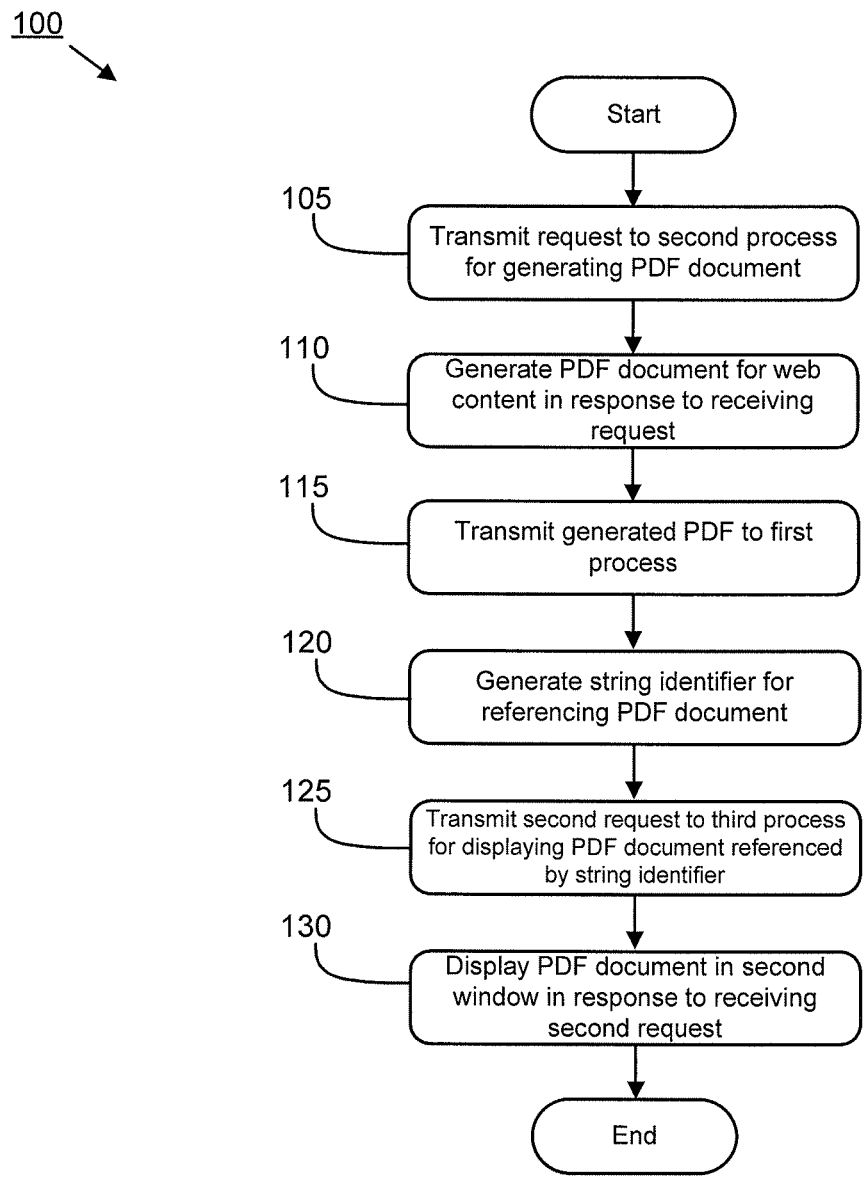
FIG. 1 conceptually illustrates an example process for dynamically previewing web content in a portable document format (PDF) for display in a web client including multiple processes.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

In a typical web client (e.g., browser), previewing web content displayed in a web client for print output (i.e., a print preview) is limited to a small number of possible user interactions. For instance, the preview for print output is displayed in a modal dialog window that prevents interaction in a main application window of the web client. The preview is often generated in a proprietary format that is not accessible outside of the web client. Moreover, for a web client that executes in a single process, generating the preview is susceptible to security issues because untrusted or malicious code could execute upon loading the web content and potentially compromise the web client (e.g., by installing malware). As used herein, the term "process" when utilized in connection with the web client refers to an instance of an operating system (OS) process (e.g., a computer program that is executing). In some configurations, an OS process can include multiple threads that execute instructions concurrently.

To remedy the aforementioned issues, a web client with a multi-process architecture can be provided. For instance, the web client may include a browser process and a renderer process in which the browser process is responsible for operations for controls and a user interface for the web client, and the renderer process is responsible for operations for rendering the web content for display. By providing multiple processes that execute different functionalities, the web client can improve the robustness and security of the web client.

Some configurations can utilize the multi-process architecture of the web client to generate a preview of a print output in a window (e.g., a tab or tabbed window) of the web client for interacting with the preview. In a first process (i.e., the browser process) of the web client, a request is transmitted to a second process (i.e., the renderer process) of the web client for generating a Portable Document Format (PDF) document for web content in a first window of the web client. In the second process of the web client, the PDF document for the web content is generated in response to receiving the request from the first process. The second process of the web client then transmits the generated PDF document to the first process of the web client.

Subsequently, in the first process of the web client, the PDF document is received from the second process, and a string identifier referencing the PDF document is generated. In particular, the string identifier could be a hyperlink with the location of the PDF document. The first process of the web client transmits a second request to a third process (e.g., a second renderer process) for displaying the PDF document referenced by the string identifier. The second request in some configurations can include JavaScript code that instructs a second renderer process to display the PDF document in a second window of the web client (i.e., a new tabbed window). In the third process (i.e., the second renderer process) of the web client, the PDF document is then displayed in the second window of the web client in response to receiving the second request from the second process (i.e., the browser process).

In some configurations, the web client can include controls for dynamically re-rendering the displayed PDF document in the second window. For instance, one such control or set of controls (e.g., radio button, text box, etc.) could enable the user to select a range of pages within the PDF document (if the PDF document includes several pages) that upon selection causes the web client to dynamically re-render the PDF document with only the selected range of pages displayed in the second window. Some configurations could also provide controls for selecting the orientation of the PDF document (e.g., landscape, portrait, etc.) and dynamically re-render the PDF document based on the selected orientation. Yet one other set of controls could dynamically re-render the document in color or black and white based on the selection.

FIG. 1 conceptually illustrates an example process 100 for dynamically previewing web content in a portable document format (PDF) for display in a web client including multiple processes. In one example, the web client implements a multi-process architecture which includes different processes for rendering and browsing. More specifically, the web client can include 1) a renderer process for rendering content (e.g., for a site that a user visits), and 2) a browser process for providing the web client's user interface. The web client can further provide a channel for inter-process communication between the renderer and browser processes.

In a first process of the web client, the process 100 begins at 105 by transmitting a request to a second process of the web client for generating a PDF document for web content in a first window (e.g., a tab) in the web client. In some configurations, the request can be triggered by receiving a command (e.g., from user input) for previewing a print output of web content displayed in the web client. The first process can be a browser process in the web client and the second process can be a first renderer process in the web client. Additionally, the first renderer process can communicate with the browser process utilizing a respective named pipe. For instance, a named pipe can be system-persistent and exist beyond the life of the processes. Moreover, the respective name pipe can be used asynchronously to ensure that neither process is blocked waiting for the other process.

In the second process of the web client, the process 100 at 110 generates the PDF document for the web content in response to receiving the request from the first process. At 115, the process 100 transmits the generated PDF document to the first process via the aforementioned name piped or similar inter-process communication channel.

In the first process of the web client, the process 100 then receives the generated PDF document from the second process. The process 100 at 120 generates a string identifier for referencing the PDF document received from the second process. In one example, the string identifier for referencing the PDF document is a hyperlink of a location of the PDF document (e.g., indicating the path of the PDF document in a file system). The PDF can be locally stored in local storage in some configurations. The local storage can include, but is not limited to, different types of machine readable media such as a solid state drive (SSD), flash memory, a hard disk, etc.

The process at 125 transmits a second request to a third process for displaying the PDF document referenced by the string identifier in a second window (e.g., a tab) of the web client. In some configurations, the third process is a second renderer process in the web client. Thus, it should be understood that, in some configurations, a respective renderer process is assigned to each window (e.g., each tab window) of the web client. In the example process 100 of FIG. 1, the second process is a first renderer process and the third process is a second renderer process. By having a different renderer process assigned to each window, the web client can isolate the web content to a corresponding renderer process. In an instance where a particular renderer process is compromised (e.g., corrupted or crashes), the integrity of any other renderer process and/or the browser process in the web client is not affected.

Next, in the third process of the web client, the process 100 at 130 displays the PDF document in the second window of the web client in response to receiving the second request. Moreover, the PDF document displayed in the second window of the web client can include several pages in one example. The process 100 can display the PDF document according to one or more predetermined settings discerned from a set of features or capabilities of a designated output device (e.g., printer). The process 100 then ends.

As mentioned above, the web client can include controls for dynamically re-rendering the displayed PDF document in the second window. For instance, one such control or set of controls (e.g., radio button, text box, etc.) could enable the user to select a range of pages within the PDF document (if the PDF document includes several pages) that upon selection causes the web client to dynamically re-render the PDF document with only the selected range of pages displayed in the second window. Some configurations could also provide controls for selecting the orientation of the PDF document (e.g., landscape, portrait, etc.) and dynamically re-render the PDF document based on the selected orientation. Yet one other set of controls could dynamically re-render the document in color or black and white based on the selection. The processes described below in connection with FIGS. 2-4 describe different operations for providing the aforementioned options for dynamically re-rendering the PDF document (e.g., without requiring a manual refresh of the PDF document in the web client).

Figure 2:
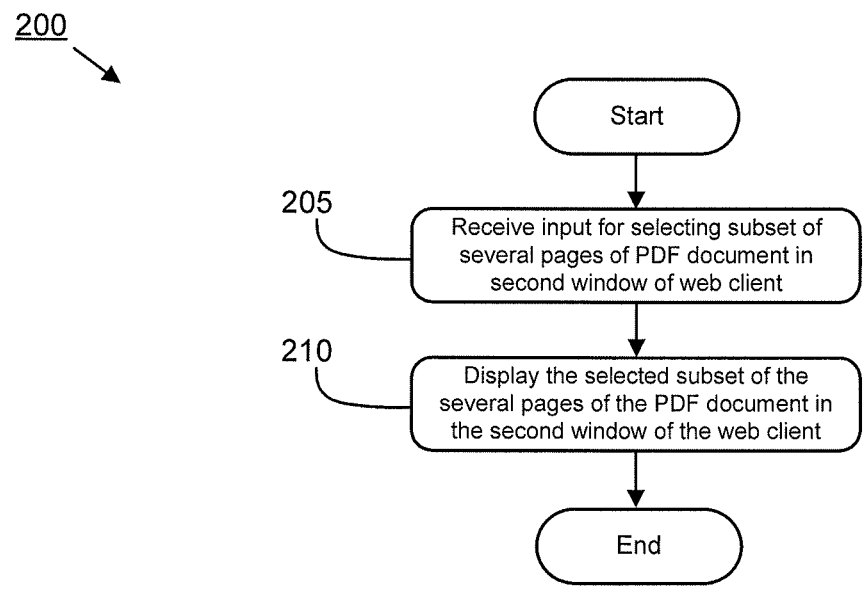
FIG. 2 conceptually illustrates an example process for re-rendering a PDF document based on a selected number of pages in a PDF document displayed in a window of a web client.

FIG. 2 conceptually illustrates an example process 200 for re-rendering a PDF document based on a selected number of pages in a PDF document displayed in a window of a web client. The process 200 can be performed conjunctively with the process 100 described above in FIG. 1. More specifically, the process 200 can be performed after the process 100 displays the PDF document in the second window of the web client at 130. The PDF document displayed in the second window of the web client includes several pages in one example.

The process 200 begins at 205 by receiving input for selecting a subset of the several pages of the PDF document in the second window of the web client. In one example, the input for the selection of one or more different pages is received from a text input box. The process 200 then at 210 displays the selected subset (e.g., a range, one or more specified pages, etc.) of the several pages of the PDF document in the second window of the web client. The process 200 can display the selected subset without requiring a manual refresh of the second window of the web client. Consequently, the process 200 can be understood as dynamically re-rendering the PDF document to display the selected subset of pages. The process 200 then ends.

Figure 3:
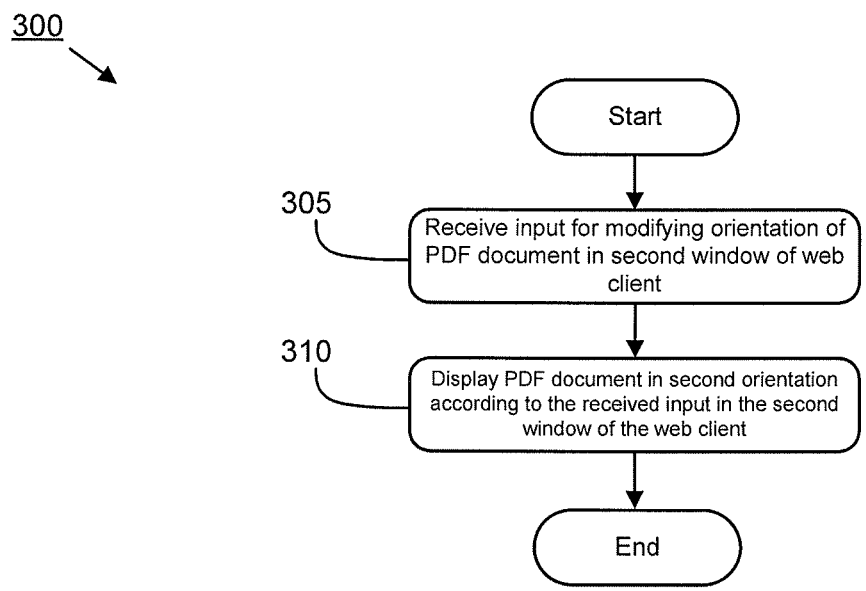
FIG. 3 conceptually illustrates an example process for re-rendering a PDF document based on a selected orientation a PDF document displayed in a window of a web client.

FIG. 3 conceptually illustrates an example process 300 for re-rendering a PDF document based on a selected orientation a PDF document displayed in a window (e.g., a tab window) of a web client. The process 300 can be performed conjunctively with the process 100 described above in FIG. 1. More specifically, the process 300 can be performed after the process 100 displays the PDF document in the second window of the web client at 130. The PDF document displayed in the second window of the web client includes several pages in one example.

The process 300 starts at 305 by receiving input for modifying an orientation of the PDF document in the second window of the web client. In one example, the orientation of the PDF document is in a portrait mode. When the PDF document is displayed in portrait mode, the height of a display area is greater than the width. The process 300 then at 310 displays the PDF document in a second orientation according to the received input in the second window of the web client. For instance, the second orientation of the PDF document can be a landscape mode in which the width of the display area is greater than the height. The process 300 can display the PDF document in the second orientation without requiring a manual refresh of the second window of the web client. Consequently, the process 300 can be understood as dynamically re-rendering the PDF document to display the PDF document in the second orientation. The process 300 then ends.

Figure 4:
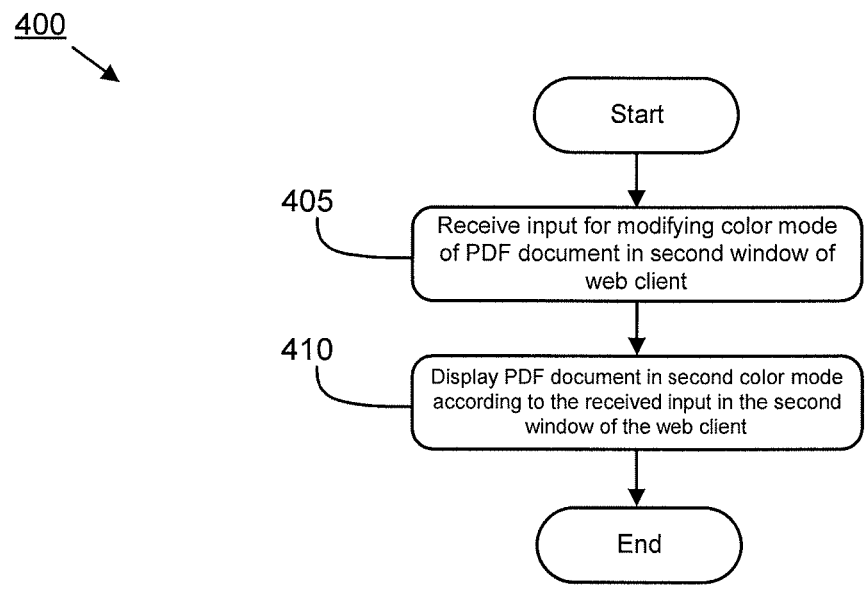
FIG. 4 conceptually illustrates an example process for re-rendering a PDF document based on a selected color mode a PDF document displayed in a window of a web client.

FIG. 4 conceptually illustrates an example process 400 for re-rendering a PDF document based on a selected color mode of a PDF document displayed in a window of a web client. The process 400 can be performed conjunctively with the process 100 described above in FIG. 1. More specifically, the process 400 can be performed after the process 100 displays the PDF document in the second window of the web client at 130. The PDF document displayed in the second window of the web client includes several pages in one example.

The process 400 starts at 405 by receiving input for modifying a color mode of the PDF document in the second window of the web client. In one example, the PDF document can be displayed according to a predetermined color mode based on the detected features or capabilities of a designated output device or peripheral (e.g., physical printer, networked printer, virtual printer, etc.). For instance, the color mode of the PDF document can be monochromatic (e.g., black-and-white, grayscale, etc.). The process 400 at 410 then displays the PDF document in a second color mode according to the received input in the second window of the web client. The second color mode of the PDF document can be an RGB color mode in one example. The process 400 therefore can display the PDF document in the second color mode without requiring a manual refresh of the second window of the web client. As result, the process 400 can be understood as dynamically re-rendering the PDF document to display the PDF document in the second color mode. The process 400 then ends.

In some configurations, the subject technology can provide a graphical user interface for configurations of the subject technology described above in FIGS. 1-4 above. For instance, the graphical user interface can include one or more controls for dynamically re-rendering the displayed PDF document in the second window according to different input received for different options in the graphical user interface.

Figure 5:
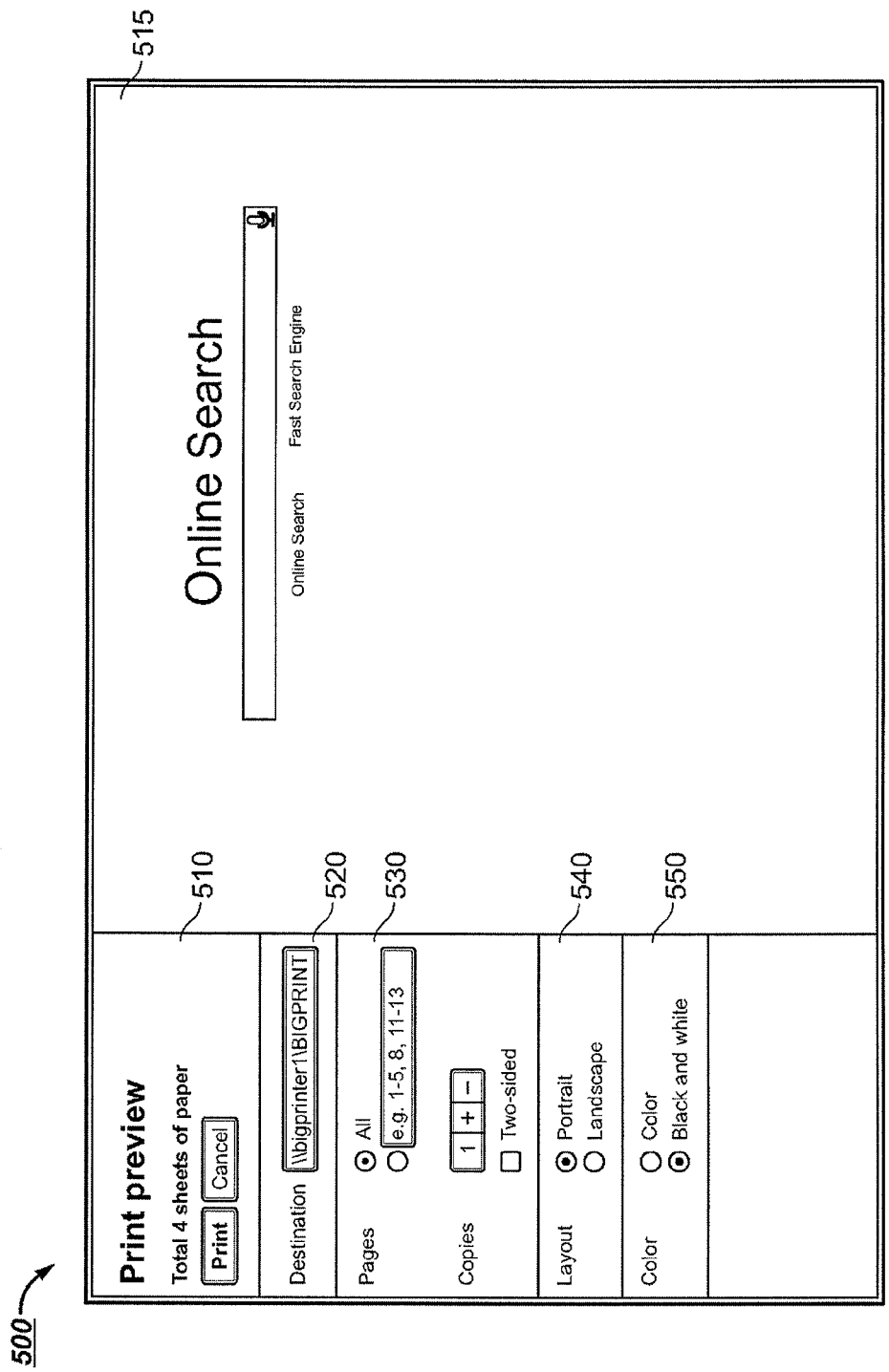
FIG. 5 conceptually illustrates a graphical user interface in which some configurations of the subject technology can be implemented.

FIG. 5 conceptually illustrates a graphical user interface (GUI) 500 in which some configurations of the subject technology can be implemented. More specifically, the GUI 500 can include different sets of graphical elements for configuring one or more options to dynamically re-render a displayed PDF document according to the one or more options. In one example, the GUI 500 is displayed in the web client after performing the operations in process 100 of FIG. 1. In particular, the GUI 500 can be displayed in a second window of the web client (e.g., in a different tabbed window from the corresponding web content displayed in a first tabbed window).

As illustrated in FIG. 5, the GUI 500 includes different sets of controls 510, 520, 530, 540 and 550 corresponding to different options. Each set of controls includes one or more graphical elements for manipulating options associated with a displayed PDF document. A graphical element can include, but is not limited to, a button, check box, radio button, slider, list box, drop-down list, menu, combo box, icon, text box, scroll bar, etc. For instance, the set of controls 510 includes graphical elements for printing the displayed PDF document. The set of controls 520 includes graphical elements for setting a destination output device (e.g., printer). The set of controls 530 includes graphical elements for setting a number of pages from the PDF document for display, a number of copies, and whether a print output is two-sided (e.g., duplex printing). The set of controls 540 includes graphical elements for selecting an orientation (e.g., portrait or landscape) of the displayed PDF. The set of controls 550 includes graphical elements for setting a color mode of the displayed PDF.

The GUI 500 also includes a display area 515 for displaying a PDF document according to the options from the sets of controls 510-555. In one example, the sets of controls 510-550 and the display area 515 are included in a single window or display area of the GUI 500. Based on input received by one or more sets of controls, the GUI 500 allows each of the sets of controls 510-550 to dynamically re-render the displayed PDF in the display area 515 (e.g., according to the example processes described above in FIGS. 2-4). For instance, the set of controls 540 can receive input to change the orientation of the displayed PDF from a portrait mode to a landscape mode. After receiving the input, the GUI 500 updates the display area 515 with the PDF in landscape mode.

Although the above description of FIG. 5 includes different example graphical elements in the GUI 500, some implementations can include other graphical elements in the GUI 500 and still be within the scope of the subject technology. Further, the GUI 500 is not required to include all of the aforementioned sets of controls. In some instances, the GUI 500 can omit one or more of the aforementioned sets of controls.

Figure 6:
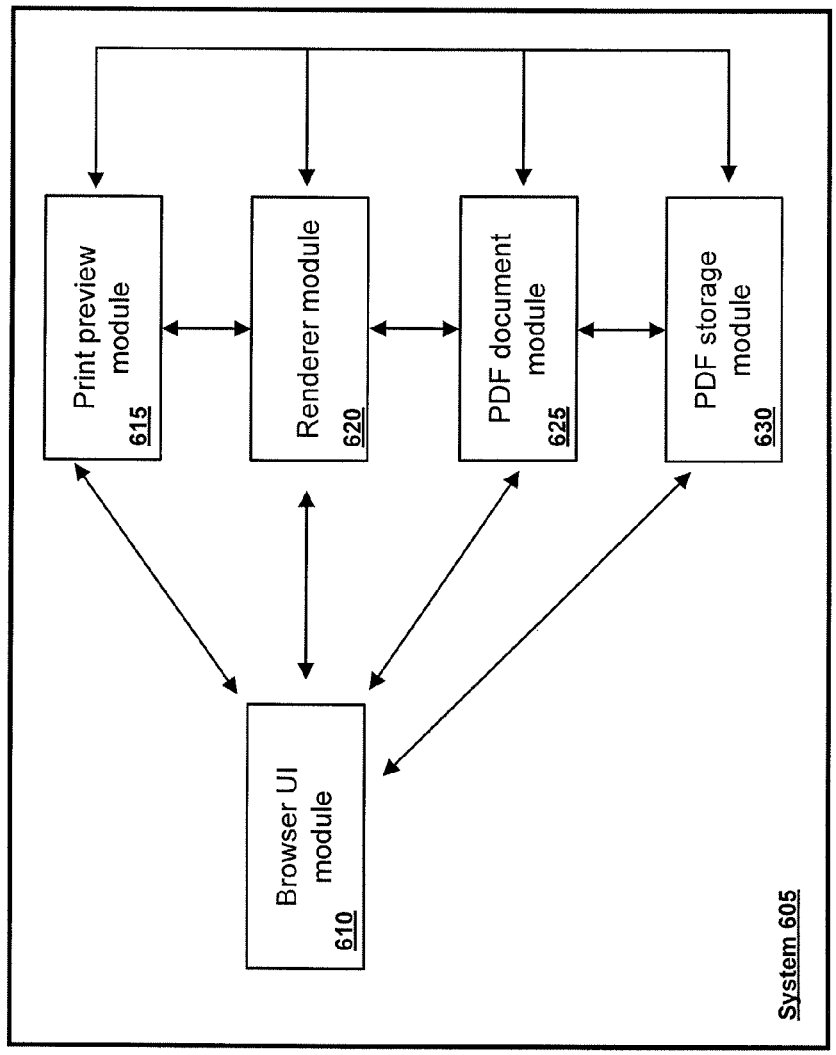
FIG. 6 conceptually illustrates an example computing environment.

FIG. 6 conceptually illustrates an example computing environment including a system for dynamically previewing web content in a portable document format (PDF) for display in a web client including multiple processes. In particular, FIG. 6 shows a system 605 for implementing the above described processes FIGS. 1-4 and the graphical user interface in FIG. 5. In some configurations, the system 605 is part of an implementation running a particular machine. The system 605 can be configured to execute the web client including multiple processes in one example.

As shown in FIG. 6, the system 605 includes several modules for providing different functionality. The system 605 is configured to include a browser user interface (UI) module 610, a print preview module 615, a renderer module 620, a PDF document module 625, and a PDF storage module 630. The browser UI module 610 is configured to transmit a request for generating a PDF document for web content in a first window in the web client. The renderer module 620 is configured to render the web content to a display context in response to the request from the browser UI module 610. In one example, the display context can include one or more different properties that specify how text and graphics from the web content are displayed. The PDF document module 625 is configured as the display context for rendering the web content by the renderer module 620. The PDF storage module 630 is configured to store the generated PDF document and identify the generated PDF document with a unique string identifier. The print preview module 615 is configured to display the PDF document identified by the unique string identifier from the PDF storage module in a second window in the web client.

Further, the print preview module 615 can implement the processes described in connection with FIGS. 2-4 and respond to input for different options described in the GUI 500 of FIG. 5. In an instance in which the PDF document includes several pages, the print preview module 615 is further configured to display a subset of the several pages of the PDF document in the second window in the web client. Moreover, in an instance in which the PDF document is initially displayed in the second window in a portrait orientation, the print preview module 615 is further configured to display the PDF document in a landscape orientation in the second window. Additionally, in an instance in which the PDF document is initially displayed in a monochromatic color mode in the second window, the print preview module 615 is further configured to display the PDF document in an RGB color mode in the second window.

As further shown in FIG. 6, each of the aforementioned modules can be configured to communicate between each other. For instance, different data, messages, API calls and returns can be passed between the different modules in the system 605.

Many of the above-described features and applications are implemented as software processes that are specified as a set of instructions recorded on a machine readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of machine readable media include, but are not limited to, CD-ROMs, flash drives, RAM chips, hard drives, EPROMs, etc. The machine readable media does not include carrier waves and electronic signals passing wirelessly or over wired connections.

In this specification, the term "software" is meant to include firmware residing in read-only memory and/or applications stored in magnetic storage, which can be read into memory for processing by a processor. Also, in some implementations, multiple software components can be implemented as sub-parts of a larger program while remaining distinct software components. In some implementations, multiple software subject components can also be implemented as separate programs. Finally, any combination of separate programs that together implement a software component(s) described here is within the scope of the subject technology. In some implementations, the software programs, when installed to operate on one or more systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some configurations are implemented as software processes that include one or more application programming interfaces (APIs) in an environment with calling program code interacting with other program code being called through the one or more interfaces. Various function calls, messages or other types of invocations, which can include various kinds of parameters, can be transferred via the APIs between the calling program and the code being called. In addition, an API can provide the calling program code the ability to use data types or classes defined in the API and implemented in the called program code.

One or more APIs may be used in some configurations. An API is an interface implemented by a program code component or hardware component ("API implementing component") that allows a different program code component or hardware component ("API calling component") to access and use one or more functions, methods, procedures, data structures, classes, and/or other services provided by the API implementing component. An API can define one or more parameters that are passed between the API calling component and the API implementing component.

An API allows a developer of an API calling component (that could be a third party developer) to utilize specified features provided by an API implementing component. There may be one API calling component or there may be more than one such component. An API can be a source code interface that a computing system or program library provides to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some configurations the API implementing component may provide more than one API, each providing a different view of or with different aspects that access different aspects of the functionality implemented by the API implementing component. For example, one API of an API implementing component can provide a first set of functions and can be exposed to third party developers, and another API of the API implementing component can be hidden (not exposed) and provide a subset of the first set of functions and also provide another set of functions, such as testing or debugging functions which are not in the first set of functions. In other configurations the API implementing component may itself call one or more other components via an underlying API and thus be both an API calling component and an API implementing component.

An API defines the language and parameters that API calling components use when accessing and using specified features of the API implementing component. For example, an API calling component accesses the specified features of the API implementing component through one or more API calls or invocations (embodied for example by function or method calls) exposed by the API and passes data and control information using parameters via the API calls or invocations. The API implementing component may return a value through the API in response to an API call from an API calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API calling component) and an API implementing component. Transferring the API calls may include issuing, initiating, invoking, calling, receiving, returning, or responding to the function calls or messages. In other words, transferring can describe actions by either of the API calling component or the API implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API implementing component. The API calling component therefore can declare variables, use pointers to, use or instantiate constant values of such types or classes by using definitions provided in the API.

Generally, an API can be used to access a service or data provided by the API implementing component or to initiate performance of an operation or computation provided by the API implementing component. By way of example, the API implementing component and the API calling component may each be any one of an operating system, a library, a device driver, an API, an application program, or other module (it should be understood that the API implementing component and the API calling component may be the same or different type of module from each other). API implementing components may in some cases be embodied at least in part in firmware, microcode, or other hardware logic. In some configurations, an API may allow a client program to use the services provided by a Software Development Kit (SDK) library. In other configurations an application or other client program may use an API provided by an Application Framework. In these configurations the application or client program may incorporate calls to functions or methods provided by the SDK and provided by the API or use data types or objects defined in the SDK and provided by the API. An Application Framework may in these configurations provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API calling component may be a local component (i.e., on the same data processing system as the API implementing component) or a remote component (i.e., on a different data processing system from the API-implementing component) that communicates with the API-implementing component through the API over a network. It should be understood that an API implementing component may also act as an API calling component (i.e., it may make API calls to an API exposed by a different API implementing component) and an API calling component may also act as an API implementing component by implementing an API that is exposed to a different API calling component.

The API can allow multiple API calling components written in different programming languages to communicate with the API implementing component (thus the API may include features for translating calls and returns between the API implementing component and the API calling component). The API however can be implemented in terms of a specific programming language. An API calling component can, in one configuration, call APIs from different providers such as a set of APIs from an OS provider and another set of APIs from a plug-in provider and another set of APIs from another provider (e.g. the provider of a software library) or creator of the another set of APIs.

The following description describes an example API architecture in which the processes described above in FIGS. 1-4 and the graphical user interface in FIG. 5 can be implemented.

Figure 7:
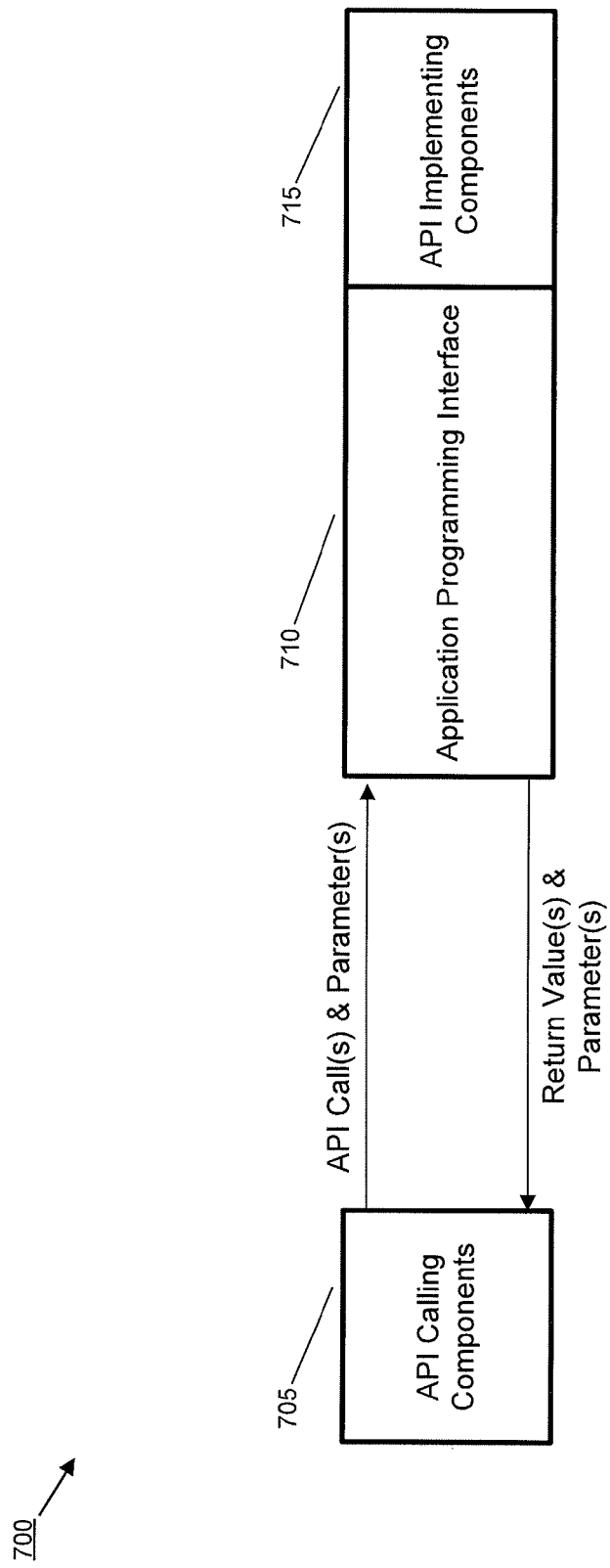
FIG. 7 conceptually illustrates an example application programming interface (API) architecture.

FIG. 7 is a block diagram illustrating an example API architecture, which can be used in some configurations of the subject technology. As shown in FIG. 7, the API architecture 700 includes the API implementing component 715 (e.g., an operating system, a library, a device driver, an API, an application program, software or other module) that implements the API 710. The API 710 specifies one or more functions, methods, classes, objects, protocols, data structures, formats and/or other features of the API-implementing component that can be used by the API-calling component 705. The API 710 can specify at least one calling convention that specifies how a function in the API implementing component receives parameters from the API calling component and how the function returns a result to the API calling component. The API calling component 705 (e.g., an operating system, a library, a device driver, an API, an application program, software or other module), makes API calls through the API 710 to access and use the features of the API implementing component 715 that are specified by the API 710. The API implementing component 715 can return a value through the API 710 to the API calling component 705 in response to an API call.

It will be appreciated that the API implementing component 715 can include additional functions, methods, classes, data structures, and/or other features that are not specified through the API 710 and are not available to the API calling component 705. It should be understood that the API calling component 705 can be on the same system as the API implementing component 715 or can be located remotely and accesses the API implementing component 715 using the API 710 over a network. While FIG. 7 illustrates a single API calling component 705 interacting with the API 710, it should be understood that other API calling components, which can be written in different languages (or the same language) than the API calling component 705, can use the API 710.

The API implementing component 715, the API 710, and the API calling component 705 can be stored in a machine-readable medium, which includes any mechanism for storing information in a form readable by a machine (e.g., a computer or other data processing system). For example, a machine-readable medium includes magnetic disks, optical disks, random access memory, read only memory, flash memory devices, etc.

The following description describes an example system in which aspects of the subject technology can be implemented.

Figure 8:
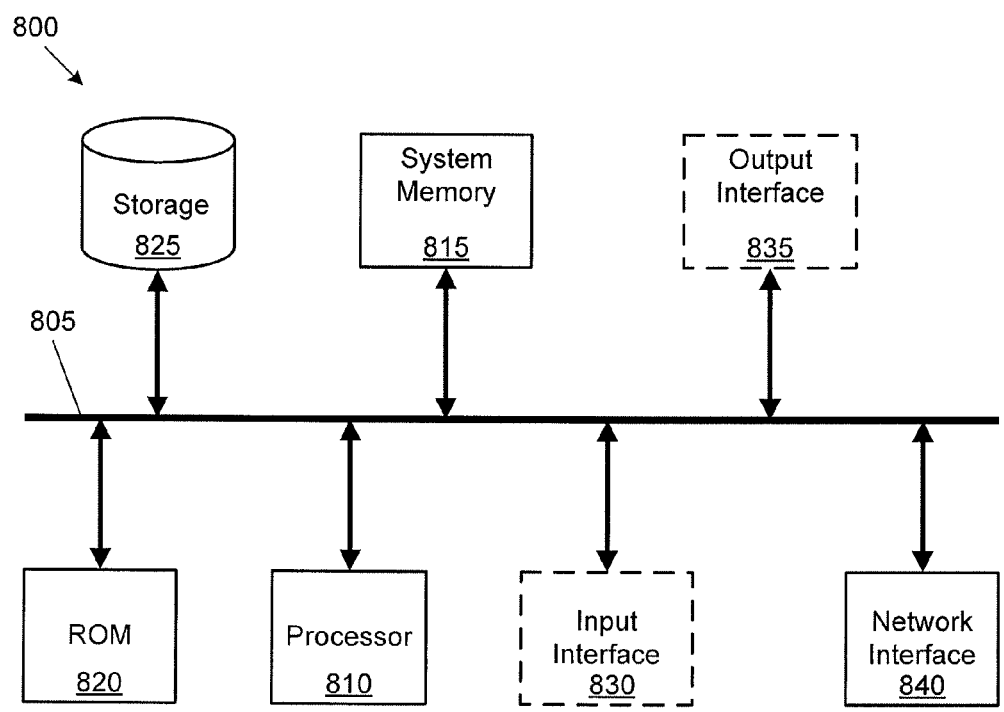
FIG. 8 conceptually illustrates a system with which some implementations of the subject technology may be implemented.

FIG. 8 conceptually illustrates a system 800 with which some implementations of the subject technology can be implemented. The system 800 can be a computer, phone, PDA, or any other sort of electronic device. Such a system includes various types of computer readable media and interfaces for various other types of computer readable media. The system 800 includes a bus 805, processing unit(s) 810, a system memory 815, a read-only memory 820, a storage device 825, an optional input interface 830, an optional output interface 835, and a network interface 840.

The bus 805 collectively represents all system, peripheral, and chipset buses that communicatively connect the numerous internal devices of the system 800. For instance, the bus 805 communicatively connects the processing unit(s) 810 with the read-only memory 820, the system memory 815, and the storage device 825.

From these various memory units, the processing unit(s) 810 retrieves instructions to execute and data to process in order to execute the processes of the subject technology. The processing unit(s) can be a single processor or a multi-core processor in different implementations.

The read-only-memory (ROM) 820 stores static data and instructions that are needed by the processing unit(s) 810 and other modules of the system 800. The storage device 825, on the other hand, is a read-and-write memory device. This device is a non-volatile memory unit that stores instructions and data even when the system 800 is off. Some implementations of the subject technology use a mass-storage device (such as a magnetic or optical disk and its corresponding disk drive) as the storage device 825.

Other implementations use a removable storage device (such as a flash drive, a floppy disk, and its corresponding disk drive) as the storage device 825. Like the storage device 825, the system memory 815 is a read-and-write memory device. However, unlike storage device 825, the system memory 815 is a volatile read-and-write memory, such a random access memory. The system memory 815 stores some of the instructions and data that the processor needs at runtime. In some implementations, the subject technology's processes are stored in the system memory 815, the storage device 825, and/or the read-only memory 820. For example, the various memory units include instructions for processing multimedia items in accordance with some implementations. From these various memory units, the processing unit(s) 810 retrieves instructions to execute and data to process in order to execute the processes of some implementations.

The bus 805 also connects to the optional input and output interfaces 830 and 835. The optional input interface 830 enables the user to communicate information and select commands to the system. The optional input interface 830 can interface with alphanumeric keyboards and pointing devices (also called "cursor control devices"). The optional output interface 835 can provide display images generated by the system 800. The optional output interface 835 can interface with printers and display devices, such as cathode ray tubes (CRT) or liquid crystal displays (LCD). Some implementations can interface with devices such as a touchscreen that functions as both input and output devices.

Finally, as shown in FIG. 8, bus 805 also couples system 800 to a network interface 840 through a network adapter (not shown). In this manner, the computer can be a part of a network of computers (such as a local area network ("LAN"), a wide area network ("WAN"), or an Intranet, or an interconnected network of networks, such as the Internet. Any or all components of system 800 can be used in conjunction with the subject technology.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Configurations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some configurations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes can be rearranged, or that all illustrated steps be performed. Some of the steps can be performed simultaneously. For example, in certain circumstances, multitasking and parallel processing can be advantageous. Moreover, the separation of various system components in the configurations described above should not be understood as requiring such separation in all configurations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect can apply to all configurations, or one or more configurations. A phrase such as an aspect can refer to one or more aspects and vice versa. A phrase such as a "configuration" does not imply that such configuration is essential to the subject technology or that such configuration applies to all configurations of the subject technology. A disclosure relating to a configuration can apply to all configurations, or one or more configurations. A phrase such as a configuration can refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A machine-implemented method for dynamically previewing web content in a portable document format (PDF) for display in a web client including multiple processes, the method comprising:
   in a first process of the web client, transmitting a request to a second process of the web client for generating a PDF document for web content displayed in a first window in the web client;
   in the second process of the web client, performing the operations of:
   generating the PDF document for the web content in response to receiving the request from the first process;
   transmitting the generated PDF document to the first process;

in the first process of the web client, further performing the operations of:
receiving the generated PDF document from the second process;
generating a string identifier for referencing the PDF document; and
transmitting a second request to a third process of the web client for displaying the PDF document referenced by the string identifier in a second window of the web client, wherein the first process is a browser process, the second process is a first renderer process, and the third process is a second renderer process.

2. The method of claim 1, further comprising:
in the third process of the web client, displaying the PDF document in the second window of the web client in response to receiving the second request.

3. The method of claim 1, wherein the first and second renderer processes communicate with the browser process utilizing a respective named pipe.

4. The method of claim 3, wherein communication via the respective named pipe occurs asynchronously between the first and second renderer processes and the browser process.

5. The method of claim 1, wherein the string identifier for referencing the PDF document is a hyperlink of a location of the PDF document.

6. The method of claim 5, wherein the location of the PDF document is locally stored.

7. The method of claim 1, wherein the PDF document displayed in the second window of the web client includes several pages.

8. The method of claim 7, further comprising:
receiving input for selecting a subset of the several pages of the PDF document in the second window of the web client; and
displaying the selected subset of the several pages of the PDF document in the second window of the web client.

9. The method of claim 8, wherein the input for the selection of one or more different pages is received from a text input box.

10. The method of claim 1, further comprising:
receiving input for modifying an orientation of the PDF document in the second window of the web client; and
displaying the PDF document in a second orientation according to the received input in the second window of the web client.

11. The method of claim 10, wherein the orientation of the PDF document comprises a portrait mode.

12. The method of claim 11, wherein the second orientation of the PDF document comprises a landscape mode.

13. The method of claim 1, further comprising:
receiving input for modifying a color mode of the PDF document in the second window of the web client; and
displaying the PDF document in a second color mode according to the received input in the second window of the web client.

14. The method of claim 13, wherein the color mode of the PDF document is monochromatic.

15. The method of claim 13, wherein the second color mode of the PDF document is RGB color.

16. A system for dynamically previewing web content in a portable document format (PDF) for display in a web client including multiple processes, the system comprising:
memory;
one or more processors;
one or more modules stored in memory and configured for execution by the one or more processors, the modules comprising:
a browser user interface (UI) module configured to transmit a request for generating a PDF document for web content displayed in a first window in the web client, wherein the browser user interface module comprises a browser process;
a renderer module configured to render the web content to a display context in response to the request from the browser UI module, wherein the renderer module comprises a first renderer process;
a PDF document module configured as the display context for rendering the web content by the renderer module;
a PDF storage module configured to store the generated PDF document and identify the generated PDF document with a unique string identifier; and
a print preview module configured to display the PDF document identified by the unique string identifier from the PDF storage module in a second window in the web client, wherein the print preview module comprises a second renderer process.

17. The system of claim 16, wherein the PDF document includes several pages.

18. The system of claim 17, wherein the print preview module is further configured to display a subset of the several pages of the PDF document in the second window in the web client.

19. The system of claim 16, wherein the PDF document is displayed in the second window in a portrait orientation.

20. The system of claim 19, wherein the print preview module is further configured to display the PDF document in a landscape orientation in the second window.

21. The system of claim 16, wherein the PDF document is displayed in a monochromatic color mode in the second window.

22. The system of claim 21, wherein the print preview module is further configured to display the PDF document in an RGB color mode in the second window.

23. A machine-readable medium comprising instructions stored therein, which when executed by a machine, cause the machine to perform operations comprising:
in a first process of a web client, transmitting a request to a second process of the web client for generating a PDF document for web content displayed in a first window in the web client;
in the second process of the web client, performing the operations of:
generating the PDF document for the web content in response to receiving the request from the first process; and
transmitting the generated PDF document to the first process;
in the first process of the web client, further performing the operations of:
generating a string identifier for referencing the PDF document received from the second process;
transmitting a second request to a third process of the web client for displaying the PDF document referenced by the string identifier in a second window of the web client; and
in the third process of the web client, performing the operations of:
displaying the PDF document in the second window of the web client in response to receiving the second request, wherein the PDF document includes several pages;
receiving input for selecting a subset of the several pages of the PDF document; and displaying the selected subset of the several pages of the PDF document in the second window of the web client, wherein the first process is a browser process, the second process is a first renderer process, and the third process is a second renderer process.

* * * * *